Nov. 27, 1962   J. T. McNANEY   3,066,235
MEANS FOR INFLUENCING SELECTIVELY THE CROSS
SECTION AND THE HORIZONTAL AND VERTICAL
POSITION OF A CATHODE RAY ELECTRON BEAM
Filed Nov. 12, 1959   4 Sheets-Sheet 1
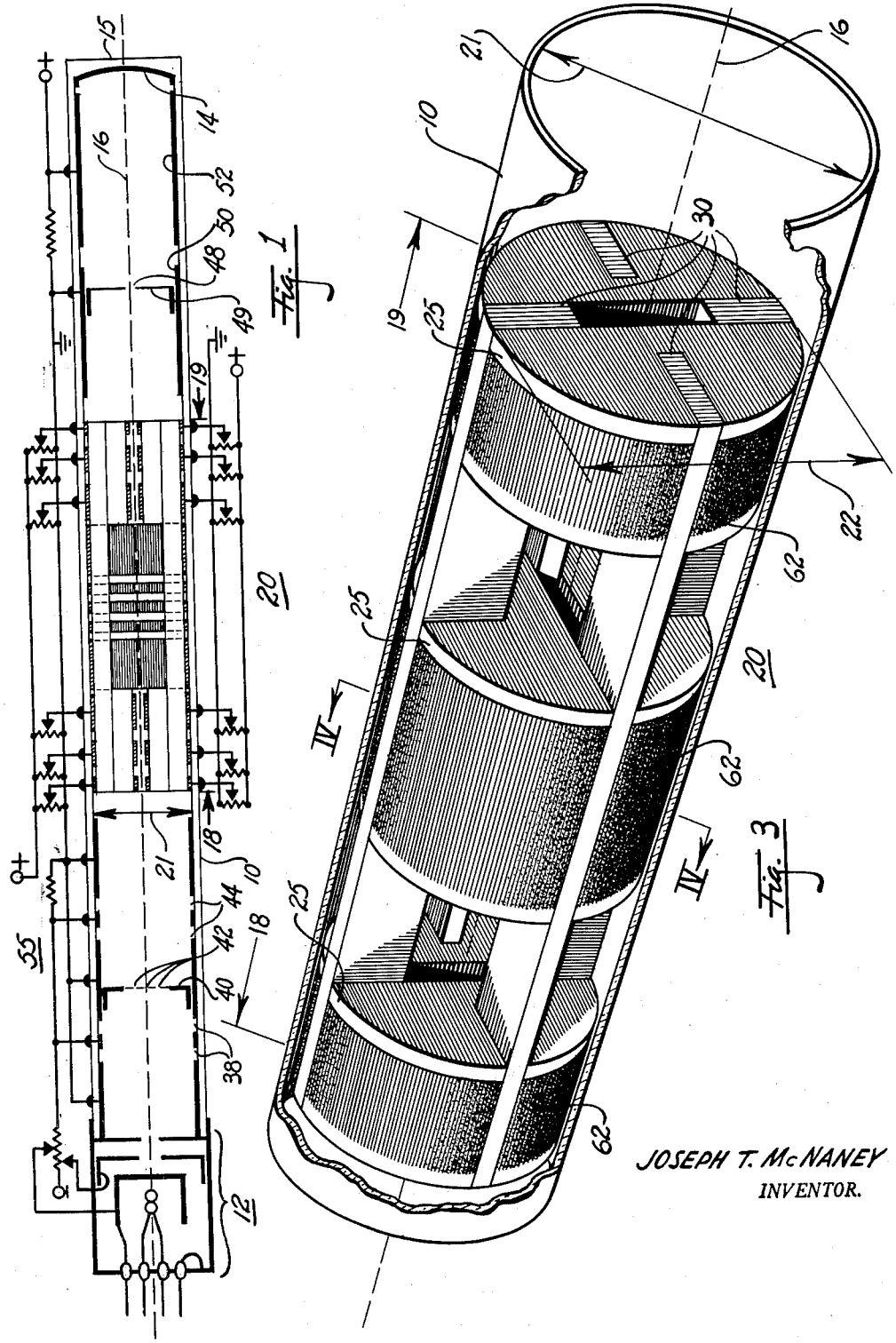
JOSEPH T. McNANEY
INVENTOR.

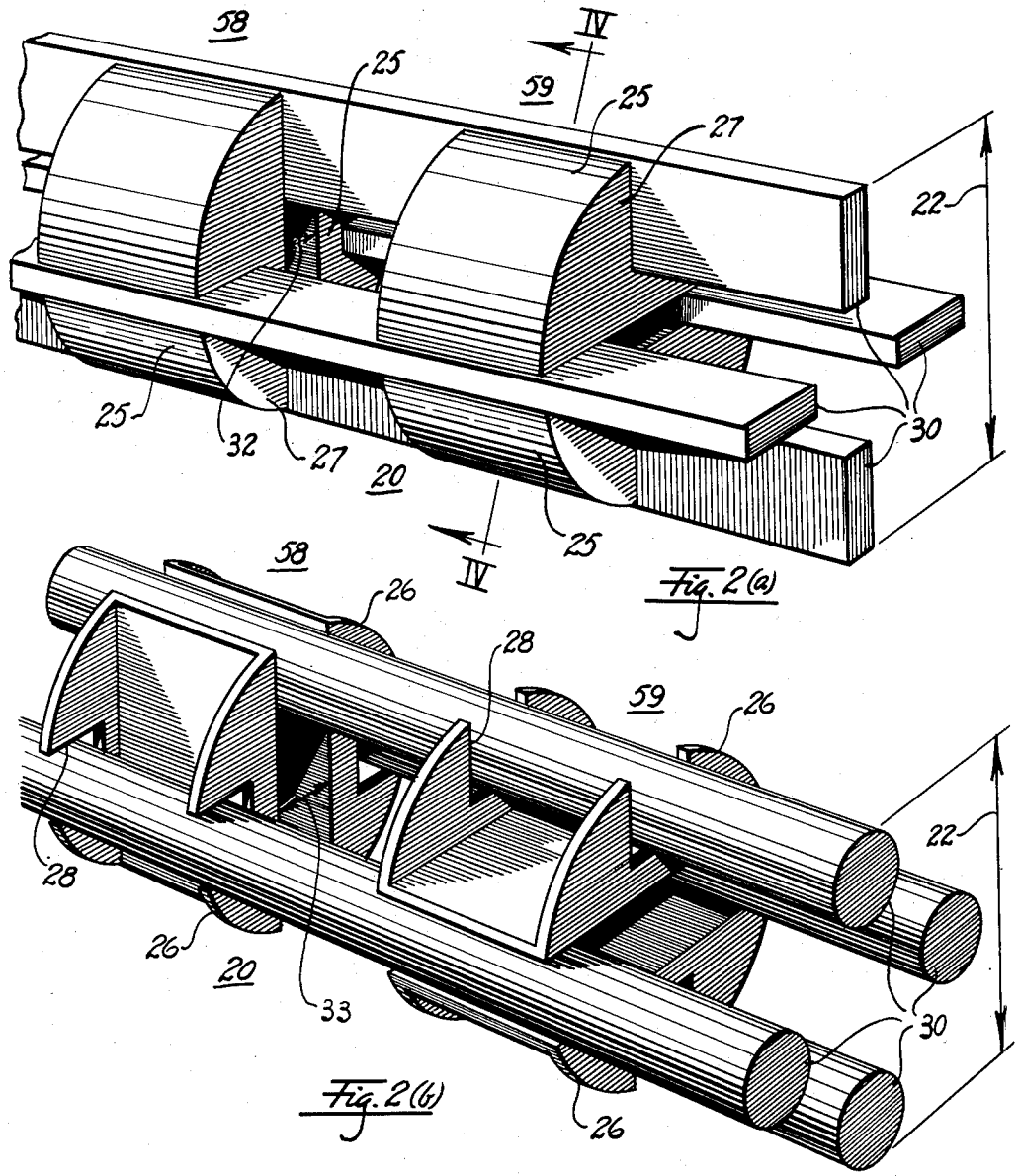

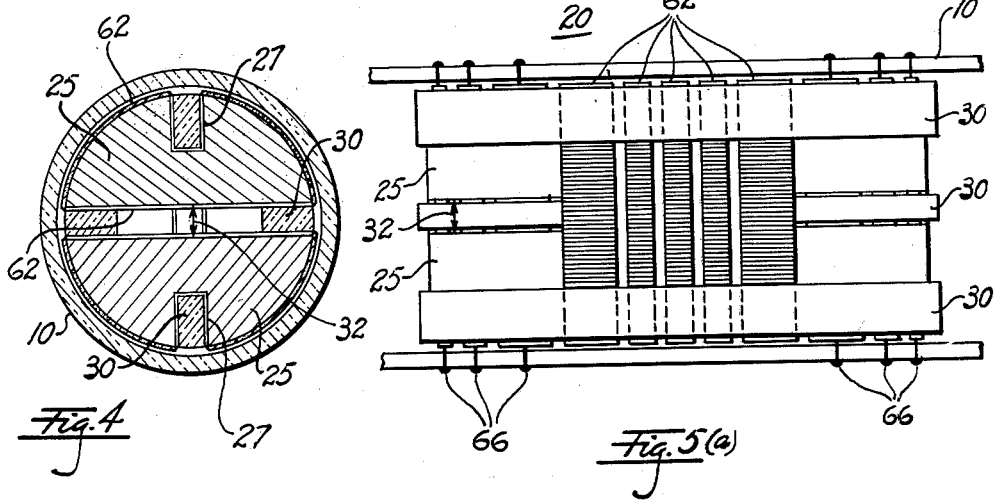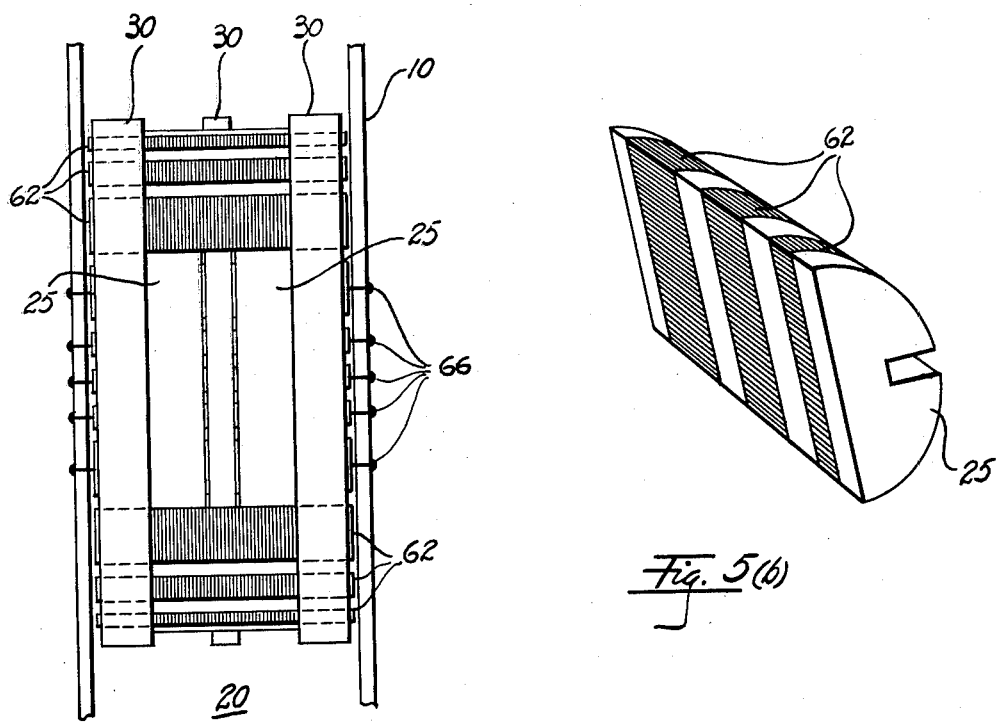
JOSEPH T. McNANEY
INVENTOR.

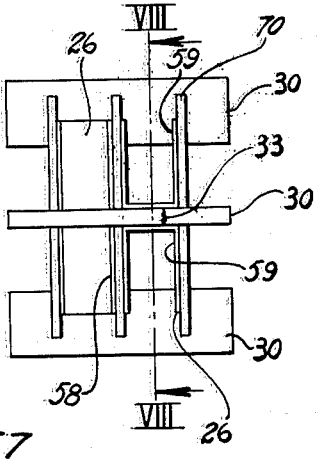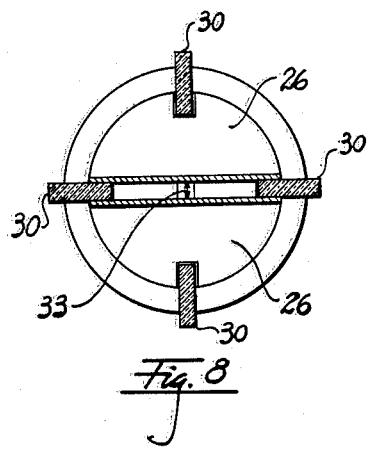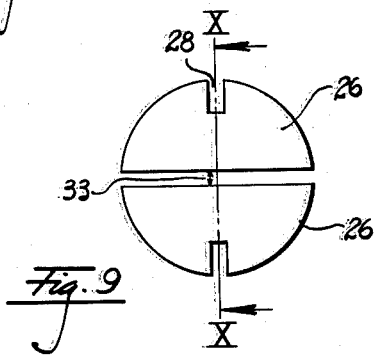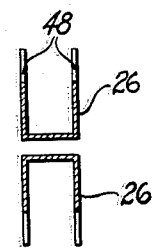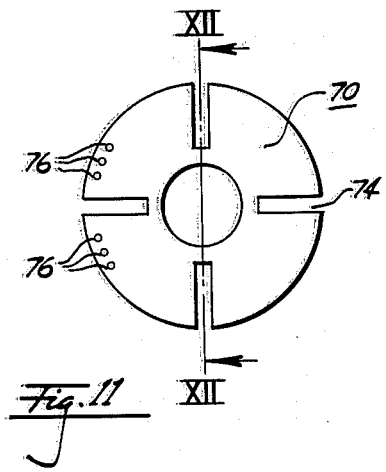

3,066,235
Patented Nov. 27, 1962

3,066,235
MEANS FOR INFLUENCING SELECTIVELY THE CROSS SECTION AND THE HORIZONTAL AND VERTICAL POSITION OF A CATHODE RAY ELECTRON BEAM
Joseph T. McNaney, La Mesa, Calif., assignor to General Dynamics Corporation, Rochester, N.Y., a corporation of Delaware
Filed Nov. 12, 1959, Ser. No. 852,435
18 Claims. (Cl. 313—78)

This invention relates generally to a means for utilization with cathode ray tubes, and more particularly to a means for influencing selectively the cross section and the horizontal and vertical deflection of an electron beam of the cathode ray tube.

In recent years the accuracy requirement demanded in alignment of components of cathode ray tube structures has increased tremendously. In the early days of cathode ray tubes, electron beams were more or less haphazardly deflected from a predetermined longitudinal axis of the tube. At present, in the utilization of cathode ray tubes such as shaped beam tubes, it has become necessary and mandatory to very accurately and critically cause influencing of the electron beam so that the end positioning of that beam is determinable within very small tolerances. My U.S. Patents 2,735,956 and 2,761,988 show several constructions of such shaped beam tubes. In each of these constructions it is necessary to know where the electron beam is, and, after determining that factor, to deflect it from that path a predetermined deflection either to illuminate a character or to position a character at an aperture, subsequently, to portray these characters upon a screen. The need for accurate and critical influencing has necessitated critical alignment of the electrodes within a cathode ray tube. Therefore, considerable jigging and aligning of the electrodes, or electro-optical elements, through use of mechanical and optical means is necessitated prior to sealing and evacuating the container or tube. The alignment problems are further complicated in that after the cathode ray tube is energized (it being no longer possible to enter the evacuated tube vacuum to re-align the elements) the heat generated in operation of the tube often causes further misalignments.

In order to obviate all of these aforestated difficulties, it has been found desirable through the present invention to create a modular or structural means to automatically effect electrode placement through construction of the tube and its elements, so that the elements capable of influencing the electron beam, such as lenses and deflection plates, are positioned upon placement within the cathode ray tube. Such modular construction, using the shape of the internal surface of the cathode ray tube, or internal surfaces of auxiliary means supported in such tube as the confining or encompassing dimension, will permit an inexperienced person merely to place the modular sections together and to slip them assembled into the auxiliary support means or the envelope of the cathode ray tube. The envelope, for example, causes the constraining of the modular construction and gives it alignment and structural rigidity all within the tube envelope. Once this modular construction is so positioned within the envelope of the tube, aligned through its positioning, it requires no additional alignment or re-alignment.

The tube construction previously shown in my application Serial No. 710,237, filed January 31, 1958, now abandoned, exemplifies utilizing the internal walls of the cathode ray tube as the dimensioning element to the electro-optical elements placed within the tube. The present invention improves upon that invention through the electro-optical elements automatically placed and aligned in conformance with the predetermined internal tube surface.

The present invention provides for a means positioned within a cathode ray tube and intermediate the target and the beam generating means, which means is capable of influencing selectively either the cross section or the vertical or horizontal deflection of the beam, as may be desired. The beam influencing means is provided with an outer encompassing dimension which is almost that of, but less than, the predetermined internal dimension of the inner or internal surface of the support member or the cathode ray tube envelope. There are placed within that encompassing dimension at least two preformed members, each of which has at least one keyway formed therein. Four longitudinally extending key elements are utilized together with the two preformed members with the key elements or keys being placed in quadrature with each other, and symmetrically positioned about the encompassing dimension. Each key element, therefore, being in quadrature with the other, has two of the key elements positioned within the keyways of the preformed members, and two of the key elements cooperating with the members to provide therebetween a spaced apart predetermined dimension. The key elements, therefore, act to selectively position, as well as space apart, each of the members from and with respect to each other. This is essentially the basic construction. Of course, additional preformed members may be added, and the spaced-apart dimension intermediate one pair of such members may provide spaced apart deflection plate for influencing the vertical and horizontal positioning of the beam. Further, two pair of preformed members longitudinally spaced apart one from the other, may have impressed therebetween an electrostatic field whereby the two pair of members therebetween provide an electron lens to influence the cross section upon the electron beam. It can thus be seen that the present beam influencing means has several different uses, and therefore considerable utility in connection with a cathode ray tube construction and its influencing of the electron beam.

In addition to the objects and advantages aforestated, it is an object of this invention to provide a simple and compact self-aligning beam influencing or beam deflection means which is of a simple, trouble-free construction.

It is another object of the invention to provide a beam influencing or beam deflection means which is capable of aligning itself with the longitudinal axis of a tubular support means or envelope of a cathode ray tube, wherein the beam-influencing means is placed within the tubulation or envelope of such tube and oriented thereby.

It is another object of the present invention to provide a beam influencing structure for a cathode ray tube positioned within the tube, which is capable of utilizing preformed members of a predetermined configuration and size, together with preformed keys of a predetermined configuration and size, all of which may be assembled by relatively inexperienced labor, still not sacrificing any of the accuracies necessary in electro-optical element alignment within the tubes.

It is another object of the invention to provide a beam influencing structure for a cathode ray tube for use therewithin which is self-aligning, under the influence of the tube, to provide predetermined dimensions from and about the longitudinal axis of the cathode ray tube.

It is another object of the invention to provide means for influencing the electron beam within an evacuated container which is capable of being adapted either to influencing the cross section of the electron beam, or influencing its vertical and horizontal positioning by deflection with respect to a normal electron path, or both.

Other objects will appear hereinafter as the description of the invention proceeds.

The novel features of the invention and how the objects are attained will appear more fully from the specification and the accompanying drawings, showing embodiments of the invention and forming a part thereof, and all these novel features as are, and intended to be, pointed out in the appended claims. Wherefore in the drawings:

FIGURE 1 shows schematically and diagrammatically a construction of a cathode ray tube utilizing the present invention;

FIGURES 2(a) and 2(b) show in perspective two simplified constructions of the beam influencing means of the invention;

FIGURE 3 is a view in perspective showing a complete deflection unit structure and its relation to the electro-optical or longitudinal axis of an electron beam;

FIGURE 4 is a cross section along line IV—IV of FIGURE 3;

FIGURE 5 is a longitudinal cross section of the construction of the beam influencing or deflection means, shown in FIGURE 1, showing in cross section the vertical deflection plates and in plan view the horizontal deflection plates;

FIGURE 6 is a view similar to that of FIGURE 5 rotated 90 degrees about the longitudinal axis with respect to FIGURE 5;

FIGURE 7 is a plan view of the embodiment of the invention wherein the preformed members are formed by bending at two right angles of a circular piece of material;

FIGURE 8 is a cross section along line VIII—VIII of FIGURE 7;

FIGURE 9 is a detail view in elevation of the preformed members formed by bending from a circular piece of metal and showing two members in their spaced apart relation;

FIGURE 10 is a cross sectional view along line X—X of FIGURE 9.

FIGURE 11 is a plan view of an insulating disk in accordance with the invention;

FIGURE 12 is a cross sectional view along lines XII—XII of FIGURE 11.

Referring more particularly to the drawings for a detailed explanation thereof, and to further demonstrate the invention, I refer to FIGURE 1. In FIGURE 1 is shown a particular type of cathode ray tube; namely, a shaped beam tube construction, such as is exemplified in my copending Serial No. 710,237, and filed January 21, 1958, now abandoned. While the inventive concepts may be used in any cathode ray tube construction, I desire to exemplify the invention as applied to the shaped beam tube.

An evacuated container may be in the shape of a cathode ray tube envelope such as the shaped beam tube exemplified in FIGURE 1. The evacuated container 10 has positioned within and at one end thereof, an electron beam generating and projecting means 12, which means 12 will generate and project an electron beam along the tube envelope 10 toward the other end of target 14. Target 14 may be any well known electron responsive screen such as phosphor or the like. The phosphor may have an aluminum overcoating, as is well known in the art, to enhance the response of the screen to the impingement of the beam, causing a light image thereupon. The light image may be viewed externally of the tube or container 10, at window 15.

The container 10 is provided with a predetermined and positioned longitudinal axis 16. The axis 16 may serve both as the longitudinal axis of container 10 and the electro-optical axis of the elements related to the beam. Therefore, both the beam generating and projecting means 12 and the target or screen 14 may be coaxially disposed with respect to the longitudinal axis 16 effecting alignment of the necessary electro-optical elements thereabout.

The container 10, for example, further provides as a portion thereof, a longitudinal section exemplified as extending from 18 to 19 along the internal surface of the container 10. This longitudinal section 18, 19 has an internal surface extending longitudinally a predetermined extension, wherein the surface has a predetermined internal dimension. The internal dimension may also be thought of as an internal encompassing dimension. To exemplify, if the container 10 has, for instance, a cylindrical section from 18 to 19, the internal dimension could be described as the internal circumferential dimension. While in the present example container 10 is exemplified as presenting such an internal surface and utilizing a uniform dimensional tubulation, it is within the ambit of the invention to include cathode ray tubes, or support tubulations, of varied cross sections and of any desired shape. The most utilized shapes of cathode ray tubes include an enlarged envelope at the screen portion and a smaller diameter tubular section adjacent the beam generating means. The two parts are joined together in manufacture. The smaller tubular section may be used in the area adjacent the beam generating means to provide the uniform or the predetermined internal dimension to be utilized in the instant invention or in this area an additional gun element support tubulation may be used to provide the predetermined internal dimension. The predetermined internal dimension is an important part of the present invention, in that it defines the confines within which a part of the invention, namely, a beam influencing construction, may be placed, constrained or positioned.

Of course the cylindrical container 10 is exemplified only, and it should be clearly understood that other cross-sectionally shaped containers or gun element support tubulations within such containers such as rectangular, square, triangular, or even an irregular shape could be utilized in the present invention. Therefore, the cylindrical nature of the showing in FIGURE 1 of container 10, for example, should not be deemed to so limit the invention. It is necessary that the internal dimension of the element support member be predetermined and be a known factor. This being so, its relation to the longitudinal axis 16 of the container should also be a known factor.

Disposed then, immediately adjacent the internal dimension, and if desired, in contact therewith, is a means positioned in the path of the beam, and about the beam intermediate the ends of the container 10 to influence selectively the cross section and the horizontal and vertical position of the beam, either one or the other, or both, as may be desired. This means, generally designated as the numeral 20, is provided with an outer encompassing dimension 22, as shown in FIGURES 2(a) and (b). Dimension 22 is substantially that of, but slightly less than, the predetermined internal dimension 21 of the internal surface 18, 19. Therefore, the internal surface 18, 19 with its predetermined internal dimension 21, sets the limits for the means 20 in its encompassing dimension 22. If desired, means 20 may be constrained by appropriate dimensioning of the dimension 22. Of course, it should be realized that, while FIGURES 2(a) and 2(b) show means 20 capable of being utilized with a cylindrical container 10, the means 20 may be made to conform to any known support configuration to complement that of the shape and size of internal surface 18, 19. Such other forms of constructions are clearly within the scope of the present invention.

The means 20 as detailed in FIGURES 2(a) and 2(b), includes in its simplest construction at least two preformed members 25 or 26. Each member 25 or 26 is provided with at least one keyway 27 or 28, respectively. There are used with the members and the keyways four longitudinally extending key elements or keys 30. The key elements 30 are preferably quadraturely and symmetrically positioned about the encompassing dimension, each of the key elements being in quadrature with respect to the other. At least two of the key elements 30 are positioned within the keyways 27 or 28, and at least two of the key elements or keys 30 cooperate with the members 25 or 26, to provide between the members a uniformly spaced slot or spaced apart dimension 32 or 33, respectively. Each of the complementing members has one of its surface portions facing the other member's surface portion. The key elements 30, therefore, acting together upon and with members 25 or 26, position or space each of the key members from and with respect to the other, and hold the members in a particular spaced-apart dimension one from the other, while aligning them with each other. Of course the overall outer encompassing dimension 22 of the members 25 and the keys 30 is limited to the internal surface dimension 21. Therefore, the key and member construction, and the dimensions, are so selected as to provide substantially coaxial, or, if desired, symmetrical placement, or both, of means 20 about the longitudinal axis 16 within the container 10. The two complementing members 25 or 26, together with the positioned keys 30, have an overall dimension which, together with about one half of the width of one of the keys, is less than one half of the internal dimension 21 of tubulation 10. The keys 30, together with members 25 or 26, and their keyways correlate pairs of members into a composite unit 20. It should be understood that keys 30 may be rectangular in cross section, round, or of any other suitable shape or dimension. Further explanation of means 20 will be had following completion of the general description of FIGURE 1.

There is further provided in FIGURE 1 a shaped beam tube construction similar to that exemplified in my copending application Serial No. 710,237, filed January 21, 1958, now abandoned, wherein the electron beam is first influenced by a pair of lenses 38 to position the beam as is desired onto a matrix 40. The beam is projected through desired openings 42, one or more of which may be illuminated to provide the beam with a corresponding beam cross section. Following the cross sectional formation of the beam, the electron forming lenses 44 effect a further re-positioning of the beam converging it toward axis 16, and effecting lensing action upon the beam to place the beam substantially along the longitudinal axis 16 at minimal cross section within the means 20. Means 20 effects deflection of the beam, so that a particularly desired cross section thereof is projected through the aperture 48 of aperture plate 49. Subsequent thereto, lensing may be effected upon the beam by subsequently positioned electrodes 50 and 52 to enlarge the beam, as desired, upon the target 14 for viewing at the window 15.

There is also shown in FIGURE 1 a schematic exemplary operating circuitry 55 capable of operating the tube and its constituent elements. Circuitry 55 exemplifies connections between the various elements with a potential effecting an operable construction. It should be realized that means 20 will be provided with operating potentials in accordance with the results expected to be achieved by means 20. While means 20 is here exemplified basically as a deflection unit, it should be realized that means 20 may have, for example, its members spaced apart to provide electron lensing electrodes similar to that shown by the numeral 38. Of course, the members 25 or 26 provided with the spaced apart dimension 32 or 33, effects deflection. Intermediate two pair of members 25 or 26, one pair spaced longitudinally from the other along the longitudinal axis 16, a lens is provided to effect lensing action under the influence of potentials properly adjusted therebetween. Therefore, both the deflection and the lensing applications, as well as any other applications that means 20 may be utilized in influencing the beam, are included in this invention. Of course, it should also be realized that the members 25 or 26 may be used either to provide horizontal deflection, as is shown in FIGURES 2(a) and 2(b) in their position 58, or vertical deflection, as shown in their position 59.

Having thus described the inventive concept, construction and operation and its relation to cathode ray tube elements, I will now detail other aspects of the invention and some added embodiments thereof. In the basic construction, the members 25 or 26 may be constructed either as is shown in FIGURES 2(a) (as members 25) wherein the members are of a solid construction, or, as is shown in FIGURE 2(b) (members 26) wherein the members are a formed and non-solid construction.

In the solid construction as is shown in FIGURE 2(a), member 25 may be made of a conductive or a non-conductive material. If the member is made of a conductive material, then the portion 27 adjacent the key elements or keys 30, may be made of an insulating material, or, the key members be insulated from member 25. However, this is not necessary unless desired. It is merely necessary that no electricity be conducted between the key members 30 and the members 25, if the desired operation does not require it. There may be instances, of course, where conduction therebetween is desired. Clearly, the construction is versatile and adaptable to almost any desired operating conditions.

In the spaced apart dimension 32 of the solid constructed members 25, there may be provided a conductive coating disposed upon the flat portion or outer surface, or both, of the solid member 25, as exemplified in the construction of FIGURE 3. In FIGURE 3, there is disposed upon the surface of solid member 25 a conductive coating 62 including the surfaces of the member adjacent their spaced-apart dimension 32. These opposing surfaces of conductive material, then, may have impressed thereupon a desired potential, effecting electrostatic deflection across the spaced apart dimension 32. It is also possible to use these surfaces throughout the entire dimension of the spaced-apart dimension 32, encompassing the longitudinal axis 16. In the last stated construction, two of the pairs of members 25 are longitudinally spaced apart along the axis 16, so that an electrostatic field may be impressed upon each of the respective pairs of members creating an electrostatic lens therebetween to effect a lensing action or deflecting force upon the cross section of the electron beam.

A complete deflecting unit 20, such as is exemplified in the schematic of FIGURE 1, is shown in great detail in FIGURES 3, 4, 5, and 6. In these figures at least three separate spaced apart pairs of members 25, each having deflecting surfaces, are utilized. The constructions of these figures are all based upon that of FIGURE 2(a). The members 25 are positioned about the axis 16 within the tubular section 18, 19, and having their outer encompassing dimension 22 in contact with and against the internal surface dimension 21 of the tubular support. Therefore, an automatic alignment and positioning of members 25 with keys 30 is effected therewithin with respect to the axis 16. The construction of FIGURE 2(b) which exemplifies the formed and non-solid member construction may also be used in the embodiment of FIGURES 3, 4, 5, and 6. The solid member 25 construction of the beam influencing or deflection structure 20, shown in FIGURES 3 to 6, utilizes the coating or metallic surface 62 as its potential responsive elements. The metallic surface 62 may be so disposed about the outer surface of the member 25 as to provide electrical connection with conductive pins 66 from the conductive surface 62 through the tube 10, to exterior connections. Of course, in this construction it may be desirable that the keys 30 or the keyways 27 be of an insulating material so that electrical short circuits will not arise.

Shown in FIGURE 4, is a cross sectional view along line IV—IV of FIGURE 3, wherein conductive surfaces 62 intermediate the spaced apart dimension 32, are continued around the member 25 and contact pins 66 to, for example, the outside of the tube 10. Here in cross section is better shown the action of the key elements or keys 30 with respect to the members. It is clearly shown that the members 25 are separated by keys 30 to form or provide the dimensions 32. In addition, the keys 30 also cooperate with the keyways 27 within the members 25 with respect to each other and the internal surface 18, 19 of the container 10. Thus, the automatic alignment is provided by predetermined dimensioning of the various portions of the inventive construction.

FIGURES 5(a) and 5(b) show in greater detail the means 20 used in FIGURE 1. FIGURE 5(b) shows in perspective one member and how that member may utilize multiple coatings of coatings or surfaces 32. These coatings may be of varying widths, as shown therein, to achieve a composite deflection system providing coplanar deflection. Such a coplanar construction for deflection systems is disclosed in my copending application Serial No. 840,851, filed September 19, 1959, and assigned to the common assignee hereof. Therefore, it should be realized that great flexibility exists in the utilization and construction of the invention in that the members 25 may be individual units, as shown in FIGURE 2, or as shown in FIGURE 5(b). As shown in FIGURE 5(b), the inventive construction may include multiple individual deflecting surfaces 62 upon each member. FIGURE 6 shows the construction of FIGURE 5(a) rotated 90 degrees to exemplify the construction of the deflection means upon the outer member 25. These constructions further show how units of preformed members may be stacked in an array, each of the members including a unitary block as shown in FIGURE 5(b) with its encircling plurality of conductor strips 62 to connect with pins 66.

FIGURE 7 shows in greater detail the construction shown in FIGURE 2(b). The plan view of FIGURE 7 shows side-by-side the construction of preformed members 2(b), one construction for horizontal deflection 58 and one construction for vertical deflection 59. The two constructions 58, 59 are spaced apart by an insulating spacer 70. Insulating spacer 70, shown in greater detail in FIGURE 11, has keyways 74 formed therein to correspond to the keyway orientation of the members 26. There may, of course, also be provided adjacent the periphery of the insulating disk member or element 70 a plurality of openings 76. Openings 76 may receive therethrough necessary conductors or rods needed to energize the various elements used in the construction. FIGURE 12 presents the insulating disk 70 in cross section along the line XII—XII of FIGURE 11.

The elevational showing of two side-by-side members 26 as shown in FIGURE 7 also shows the operation of the keys 30 to effect quadrature alignment of the horizontal members 58 and the vertical members 59. The spaced apart dimension 33 between members 26 is provided by the thickness or width of the keys 30. The deflection surfaces provided upon the opposing surfaces of members 26, when actuated by the deflection potentials, establish the electrostatic field across the dimension 33 to influence the electron beam. The cross section of FIGURE 7 along line VIII—VIII is shown in FIGURE 8 exemplifying the dimensioning effected by the keys 30 upon the members 26 to provide the predetermined spacing and dimensioning with respect to each other, and to provide the dimension 33 across which deflection, or action of the member and its impressed-in potential upon the beam, will act. There are shown in detail in FIGURE 8 the two members 26 normally positioned, their relative position complementing each other to effect the desired spacing 33 therebetween. The cross section of these members 26 along the line X—X of FIGURE 9 is shown in FIGURE 10. It can be seen that the members 26 may be punch-pressed metallic disks, for example, providing generally a circular piece of conducting material. This circular material may then be bent or formed into the U-shaped cross section shown in FIGURE 10 by bending the disk at two 90 degree bends. The deflection surface is provided at the bottom of the U-shape. Of course, prior to bending of the circular material, the keyways 48 may be formed therein by punching slots 180 degrees removed from each other from the conducting material. After bending, the slots will be aligned with each other. Therefore, it is further seen how the invention provides the desired simplicity of formation and utilization of parts in its construction.

The particular embodiments of the invention illustrated and described herein are illustrative only, and the invention includes such other modifications and equivalents as may readily appear to those skilled in the art, all within the scope of the appended claims.

I claim:

1. In an evacuated container having as a portion thereof a longitudinal section, said longitudinal section presenting an internal surface, said internal surface extending along a predetermined longitudinal extension of said section and having a predetermined internal dimension, said container having positioned at one end thereof an electron beam generating and projecting means for generating and projecting an electron beam toward the other end of the container, a target positioned at said other end of the container for responding to the beam, means positioned in the path of the beam and about the beam intermediate the ends for influencing selectively the cross section and the horizontal and vertical position of the beam, as desired, said last mentioned means having an outer encompassing dimension substantially that of, but less than, the predetermined internal dimension of the internal surface, said means comprising at least two preformed members, and two longitudinally extending key elements, said key elements being positioned between said members about the encompassing dimension in diametrically opposing relationship to cooperate with opposing surfaces of the members and provide a transverse spaced apart predetermined dimension, whereby said key elements selectively position and space each of said members from and with respect to the other.

2. In an evacuated container having as a portion thereof a longitudinal section, said longitudinal section presenting an internal surface, said internal surface extending along a predetermined longitudinal extension of said section and having a predetermined internal dimension, said container having positioned at one end thereof an electron beam generating and projecting means for generating and projecting an electron beam toward the other end of the container, a target positioned at said other end of the container for responding to the beam, means positioned in the path of the beam and about the beam intermediate the ends for influencing selectively the cross section and the horizontal and vertical position of the beam, as desired, said last mentioned means having an outer encompassing dimension substantially that of, but less than, the predetermined internal dimension of the internal surface, said means comprising two pairs of preformed members, each of said members having at least one keyway formed therein, four longitudinally extending key elements, said key elements being quadraturely and symmetrically positioned about the encompassing dimension, each key element being in quadrature with respect to the other, two of the diametrically opposed key elements being positioned within said keyways of one pair of members and cooperating with opposing surfaces of the other pair of members to provide between said other pair of members a spaced apart predetermined dimension, whereby said key elements selectively position and space each of said members from and with respect to the other.

3. In an evacuated container having as a portion thereof a longitudinal section, said longitudinal section presenting an internal surface, said internal surface extending along a predetermined longitudinal extension of said section and having a predetermined internal dimension, said container having positioned at one end thereof an electron beam generating and projecting means for generating and projecting an electron beam toward the other end of the container, a target positioned at said other end of the container for responding to the beam, means positioned in the path of the beam and about the beam intermediate the ends for influencing the horizontal and vertical position of the beam, as desired, said last mentioned means having an outer encompassing dimension substantially that of, but less than, the predetermined internal dimension of the internal surface, said means comprising at least two preformed members of insulating material, two longitudinally extending key elements, said key elements being positioned between said members about the encompassing dimension in diametrically opposing relationship, to cooperate with opposing surfaces of the members and provide a transverse spaced apart predetermined dimension, whereby said key elements selectively position and space each of said members from and with respect to the other, the opposed spaced apart surfaces of each of said members presenting a conducting surface to provide a pair of electrostatic deflection plates for influencing the position of the beam.

4. The invention in accordance with claim 3 wherein the preformed member is constructed of a selectively shaped metallic disk having two keyways disposed 180° apart, said disk having 90° bends along two lines so as to align longitudinally the keyways, said electrostatic deflection surface being presented by the disk intermediate the 90° bends thereof.

5. In an evacuated container having as a portion thereof a longitudinal section, said longitudinal section presenting an internal surface, said internal surface extending along a predetermined longitudinal extension of said section and having a predetermined internal dimension, said contaner having positioned at one end thereof an electron beam generating and projecting means for generating and projecting an electron beam toward the other end of the container, a target positioned at said other end of the container for responding to the beam, means positioned in the path of the beam and about the beam intermediate the ends for influencing the cross secton of the beam, said last mentioned means having an outer encompassing dimension substantially that of, but less than, the predetermined internal dimension of the internal surface, said means comprising at least two pairs of preformed members, each member having at least one keyway formed therein, four longitudinally extending key elements, said key elements being quadraturely and symmetrically positioned about the encompassing dimension, each key element being in quadrature with respect to the other, two of the diametrically opposed key elements being positioned within said keyways of one pair of members and cooperating with opposing surfaces of the other pair of members to provide between said other pair of members a spaced apart predetermined dimension, whereby said key elements selectively position and space each of said members from and with respect to the other, one of said pairs of members having a predetermined longitudinal dimension, said dimension being selected in accordance with the lensing action desired upon the cross section of the beam when said members are operatively connected.

6. In an evacuated container having as a portion thereof a longitudinal section, said longitudinal section presenting an internal surface, said internal surface extending along a predetermined longitudinal extension of said section and having a predetermined internal dimension, said container having positioned at one end thereof an electron beam generating and projecting means for generating and projecting an electron beam toward the other end of the container, a target positioned at said other end of the container for responding to the beam, means positioned in the path of the beam and about the beam intermediate the ends for influencing selectively the cross section and the horizontal and vertical position of the beam, as desired, said last mentioned means having an outer encompassing dimension substantially that of, but less than, the predetermined internal dimension of the internal surface, said means comprising at least two preformed members, each having at least one keyway formed therein, four longitudinally extending key elements, said key elements being quadraturely and symmetrically positioned about the encompassing dimension, each key element being in quadrature with respect to the other, at least two of the key elements being positioned within said keyways, and at least two of the key elements cooperating with the members to provide between the members a spaced apart predetermined dimension, said key elements selectively positioning and spacing each of said members from and with respect to the other, said key elements being constructed of electrically insulating material, and each of said members having its outer layer constructed of electrically conductive material.

7. In an evacuated container having as a portion thereof a longitudinal section, said longitudinal section presenting an internal surface, said internal surface extending along a predetermined longitudinal extension of said section and having a predetermined internal dimension, said container having positioned at one end thereof an electron beam generating and projecting means for generating and projecting an electron beam toward the other end of the container, a target positioned at said other end of the container for responding to the beam, means positioned in the path of the beam and about the beam intermediate the ends for influencing selectively the cross section and the horizontal and vertical position of the beam, as desired, said last mentioned means having an outer encompassing dimension substantially that of, but less than, the predetermined internal dimension of the internal surface, said means comprising at least two preformed members, each having at least one keyway formed therein, four longitudinally extending key elements, said key elements being quadraturely and symmetrically positioned about the encompassing dimension, each key element being in quadrature with respect to the other, at least two of the key elements being positioned within said keyways, and at least two of the key elements cooperating with the members to provide between the members a spaced apart predetermined dimension, said key elements selectively positioning and spacing each of said members from and with respect to the other, said key element being constructed of electrically conductive material, and each of said keyways of said members presenting electrically insulating surfaces to said key elements.

8. A beam influencing structure for a cathode ray tube positioned within said tube, said tube having in a portion thereof an internal dimension comprising at least a pair of preformed members, each presenting at least one keyway of predetermined width, four keys longitudinally positioned in the tube for cooperating with the keyways to position and retain the members with respect to each other and the tube, said keys each having a width substantially but less than the predetermined width, each fitting within said keyway, each said member having a predetermined thickness along the longitudinal dimension and further having a predetermined configuration transverse thereto, said configuration having an overall dimension which, together with about one half the width of one of the keys is less than one half the internal dimention of the tube.

9. A beam influencing structure for a cathode ray tube positioned within said tube, said tube having in a portion thereof an internal dimension, comprising two pairs of preformed members, each presenting one keyway of predetermined width, four keys longitudinally positioned in the tube for cooperating with the keyways to position and retain the members with respect to each other and the tube, said keys each having a width substantially, but less than, the predetermined width, each fitting within said keyway, each said member having a predetermined thickness along the longitudinal dimension and further having a predetermined configuration transverse thereto, said configuration having an overall dimension which, together with about one-half the width of one of the keys is less than one half the internal dimension of the tube, one pair of said preformed members being positioned in quadrature with the other pair of said preformed members.

10. A beam influencing structure for a cathode ray tube comprising at least two pairs of preformed members each pair arranged in quadrature with the other, each pair defining a substantially uniform slot therebetween respective ones of said members of each of said pairs, each of said members having keyways formed therein for communicating with said slots between each of the adjacent said members, keys positioned in communicating ones of said slots and said keyways for correlating said pairs of members into a composite unit, at least a portion of the opposing surfaces of said members constituting electrodes for creating electrostatic fields across said slots in response to potentials impressed across said electrodes.

11. A cathode ray tube deflection structure comprising at least a pair of preformed members, each of said members having an outer edge portion with a given configuration and having a flat portion, said members being arranged in opposing spaced relationship with a uniformly spaced slot extending between said flat portions of said members, a pair of substantially flat surfaced spacing keys positioned in the upper extremities of said slot for maintaining the spaced relationship of said slot and defining a cavity bordered by said members and said spacing keys, at least a portion of said opposing surfaces of said preformed members constituting electrodes for creating an electrostatic field across said slot and within said cavity in response to a potential being impressed on said electrodes.

12. A cathode ray tube deflection structure comprising a tubular part, at least a pair of preformed members positioned in said tubular part, each of said members having an outer edge portion corresponding to the inner configuration of said tubular part, said members having opposing flat portions positioned in spaced apart relationship defining therebetween a uniformly spaced slot, a pair of spacing keys each positioned in opposite extremities of said slot for maintaining said spaced relationship and for defining a cavity bordered by said members and said spacing keys, at least a portion of the opposing surfaces of said preformed members constituting electrodes for creating an electrostatic field across said slot and within said cavity in response to a potential being impressed on said electrodes.

13. A beam influencing structure for a cathode ray tube comprising at least two pairs of preformed members capable of being stacked in an array, each of said members including a unitary block having at least an outer layer of insulating material, said pairs of said members having surfaces arranged in opposing spaced relationship with a uniform slot extending therebetween, said surfaces of one pair of said members being positioned at substantially a 90 degree angle with respect to the surfaces of the other of said pair, each of said members of each of said pairs having a keyway in its edge portion opposite said surfaces, said keyways of said one of said pairs communicating with the slot between the other pair of said members and said keyways in the other of said members communicating with the slot between said one of said pairs of members, keying members positioned in said keyways and communicating with said slots for retaining said pairs of members in said array and for forming at least two aligned communicating cavities defined by said pairs of members and said keying members, each of said members having a plurality of separate conductor strips substantially encircling said member and attached to the surface of said member, said strips being arranged substantially perpendicular to said keying members and to the path of an electron beam to be deflected, said electrode members creating an electrostatic field across said slots and within said cavities in response to potentials being impressed across said electrodes and said fields of each of said communicating cavities being substantially perpendicular to each other.

14. A cathode ray tube deflection structure comprising a tubular part, at least two pairs of preformed members positioned in said tubular part, each of said members having an outer edge portion substantially corresponding to the configuration of the inner surface of said tubular part and having a flat portion, each of said pairs of said members having said flat portion arranged in opposing spaced relationship with a slot extending therebetween, said flat portion of one pair of said members being positioned at a 90 degree angle with respect to the flat portion of the other of said pair, each of said members of each of said pairs having a keyway in its edge portion opposite said flat portion, said keyway of said one of said pair communicating with said slot between said other pair of said members and said keyway in said other members communicating with the slot between said one of said pair of members, keys positioned in said keyways and communicating with adjacent said slots for securing said pairs of said members into an aligned unit and for forming communicating cavities defined by said pairs of members and said keying members, at least a portion of the flat portions of said members having electrodes thereupon for creating electrostatic fields across said slots and within said cavities in response to potentials impressed across said electrodes, said electrostatic fields in each of said communicating cavities being substantially perpendicular to each other.

15. A cathode ray tube deflection structure comprising a tubular part and at least two pairs of preformed members capable of being stacked in an array in said tubular part, each of said members including a unitary block having at least an outer layer of insulating material, said members of said pair of members having surfaces arranged in opposing spaced apart relationship defining a uniform slot extending therebetween, said surfaces of one pair of said members being positioned at a 90 degree angle with respect to the surfaces of the other of said pair of members, each of said members of each of said pairs having a keyway in its edge portion opposite said surfaces, said keyways of said one of said pair communicating with said slot between said other pair of said members and said keyway in the other of said members communicating with the slot between said one of said members, keys positioned in said keyways and communicating with said slot for correlating said pairs of members into an array and for forming at least two aligned communicating cavities defined by said pairs of members and said keys, each of said members presenting at least one metallic conductor adjacent said slot, at least a portion of the opposing surfaces of said members constituting electrodes for creating electrostatic fields across said slots and within said cavities in response to potentials impressed across said electrodes, said fields in each of said communicating cavities being substantially perpendiclular to each other, and said array having an outer configurated surface corresponding substantially to an inner configurated surface of said tubular member.

16. In a cathode ray tube deflection structure comprising at least two pairs of metallic electrode members grouped in an array, each of said pairs of said members having surfaces arranged in opposing spaced apart relationship with a uniform slot extending therebetween, said surfaces of one of said pairs of members being in quadrature with said surfaces of adjacent pairs of said members, insulating disk means positioned between pairs of said members for insulating said pairs of members one from the other when grouped in said array, each of said members having a keyway in its edge portion opposite said slot, said keyways of one of said pairs of members communicating with said slot between adjacent pairs of said members, said disks having keyways corresponding to all of said keyways of said pairs of members adjacent said disks, insulating keys positioned in said slots and in communication with said keyways for correlating said pairs of members and said disks into a composite unit, at least a portion of said opposing surfaces of said members constituting electrodes for creating electrostatic fields across said slots in response to a potential being impressed on said electrodes.

17. In an evacuated container having as a portion thereof a tubular longitudinal section, said longitudinal section presenting an internal tubular surface, said internal surface extending along a predetermined longitudinal extension of said section and having a predetermined internal circumferential dimension, said container having positioned at one end thereof an electron beam generating and projecting means for generating and projecting an electron beam toward the other end of the container, a target positioned at said other end of the container for responding to the beam, means positioned in the path of the beam and about the beam intermediate the ends for influencing selectively the cross section and the horizontal and vertical position of the beam, said last mentioned means having an outer encompassing circumferential dimension substantially that of, but less than the predetermined internal dimension of the internal surface, said means comprising at least two preformed members, each having at least one keyway formed therein, four longitudinally extending key elements, said key elements being quadraturely and symmetrically positioned about the encompassing circumferential dimension, each key element being in quadrature with respect to the other, at least two of the key elements being positioned within said keyways, and at least two of the key elements cooperating with the members to provide between the members a spaced apart predetermined dimension, said key elements selectively positioning and spacing each of said members from and with respect to the other.

18. A shaped beam tube construction having a longitudinal axis and as a portion of said tube construction a longitudinal tube section, said longitudinal section presenting an internal surface, said internal surface extending along a predetermined longitudinal extension of said section and having a predetermined internal circumferential dimension, said container having positioned at one end thereof an electron beam generating and projecting means for generating and projecting an electron beam toward the other end of the container, a target positioned at said other end of the container for responding to the beam, a beam shaping member disposed in the path of the beam intermediate the beam generating means and the target for shaping the cross section of the beam, an apertured means presenting an aperture along the axis for selecting one of the cross sections therethrough, means positioned in the path of the beam and about the beam intermediate the ends for influencing selectively the cross section and the horizontal and vertical position of the beam, said last mentioned means being coaxially disposed with respect to the axis and positioned intermediate the beam shaping member and the apertured means, said last mentioned means having an outer circumferential dimension substantially that of, but less than, the predetermined internal dimension of the internal surface so as to insure a snug fit therebetween, said means comprising at least two preformed members, each having at least one keyway formed therein, four longitudinally extending key elements, said key elements being quadraturely and symmetrically positioned about the encompassing dimension, each key element being in quadrature with respect to the other, at least two of the key elements being positioned within said keyways, and at least two of the key elements cooperating with the members to provide between the members a spaced apart predetermined dimension, said key elements selectively positioning and spacing each of said members from and with respect to the other.

References Cited in the file of this patent

UNITED STATES PATENTS

| | | |
|---|---|---|
| 2,183,309 | Flechsig et al. | Dec. 12, 1939 |
| 2,202,607 | Steudel | May 28, 1940 |
| 2,464,076 | De Gier | Mar. 8, 1949 |
| 2,473,547 | Schmidt | June 21, 1949 |
| 2,496,825 | Szegho | Feb. 7, 1950 |
| 2,888,594 | Moster et al. | May 26, 1959 |

FOREIGN PATENTS

| | | |
|---|---|---|
| 782,835 | Great Britain | Sept. 11, 1957 |